US008592518B2

(12) United States Patent
Bailey et al.

(10) Patent No.: US 8,592,518 B2
(45) Date of Patent: Nov. 26, 2013

(54) RAPID CURE THERMOSETS FROM 5- AND 6-MEMBERED CYCLIC ENAMINE COMPOUNDS MADE FROM DIALDEHYDES

(75) Inventors: Brad Bailey, Midland, MI (US); William C. Finch, Blue Bell, PA (US); Hyun K. Jeon, Midland, MI (US); Charles James Rand, Philadelphia, PA (US); Robert L. Sammler, Midland, MI (US); Francis J. Timmers, Midland, MI (US); Barry Weinstein, Dresher, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 182 days.

(21) Appl. No.: 13/152,502

(22) Filed: Jun. 3, 2011

(65) Prior Publication Data
US 2011/0306726 A1 Dec. 15, 2011

Related U.S. Application Data

(60) Provisional application No. 61/353,938, filed on Jun. 11, 2010.

(51) Int. Cl.
*C08L 61/20* (2006.01)
*C08L 61/22* (2006.01)
*C08L 61/32* (2006.01)

(52) U.S. Cl.
USPC ........................................................ 524/598

(58) Field of Classification Search
USPC ........................................................ 524/598
See application file for complete search history.

(56) References Cited

U.S. PATENT DOCUMENTS

| | | | |
|---|---|---|---|
| 4,199,400 A * | 4/1980 | Bakule et al. | 162/157.1 |
| 4,908,398 A | 3/1990 | Li Bassi et al. | |
| 5,296,530 A * | 3/1994 | Bors et al. | 524/558 |
| 5,446,089 A | 8/1995 | Shiau et al. | |
| 5,670,585 A | 9/1997 | Taylor et al. | |
| 6,080,333 A | 6/2000 | Julius | |
| 6,136,900 A | 10/2000 | Kuhn et al. | |
| 6,399,850 B1 | 6/2002 | Chen et al. | |
| 2001/0025110 A1 | 9/2001 | Zhu et al. | |
| 2003/0065239 A1 | 4/2003 | Zhu et al. | |
| 2007/0027283 A1 | 2/2007 | Swift et al. | |
| 2010/0301256 A1 | 12/2010 | Hampson et al. | |
| 2010/0310867 A1 | 12/2010 | Van Herwijnen et al. | |
| 2011/0040010 A1 * | 2/2011 | Shooshtari | 524/417 |
| 2011/0210280 A1 | 9/2011 | Jaffrennou | |

FOREIGN PATENT DOCUMENTS

| | | |
|---|---|---|
| CN | 1263135 A | 8/2000 |
| CN | 101265314 A | 9/2008 |
| EP | 0748777 A1 | 12/1996 |
| WO | 2010029266 A1 | 3/2010 |

OTHER PUBLICATIONS

Kawahara et al., "Chemical Cross-Linking by Glutaraldehyde Between Amino Groups: Its Mechanism and Effects," Polymer Modification, Plenum Press New York, 1997, pp. 119-131.
Loev et al., "The Hantzsch Reaction. I. Oxidative Dealkylation of Certain Dihydropyridines," Journal of Organic Chemistry, vol. 30, No. 6, Jun. 1, 1995, pp. 1914-1916.
Chiou et al., "Rheological and Mechanical Properties of Cross-Linked Fish Gelatins," Polymer, vol. 47, No. 18, 2006, pp. 6379-6386.
Henderson et al., "Diarylaminotetrahydropyrans from Reactions of Glutaraldehyde with Anilines: Models for Biomolecule Cross-Linking," Chemical Research of Toxicology, vol. 17, No. 3, 2004, pp. 378-382.
Margel et al., "Synthesis and Characterization of Poly(glutaraldehyde). A Potential Reagent for Protein Immobilization and Cell Separation," Macromolecules 1980, vol. 13, pp. 19-24.
Tashima et al., "Structure of a New Oligomer of Glutaraldehyde Produced by Aldol Condensation Reaction," J. Org. Chem. 1991, Vo. 56, pp. 694-697.

* cited by examiner

*Primary Examiner* — Satya Sastri
(74) *Attorney, Agent, or Firm* — Andrew E. C. Merriam

(57) ABSTRACT

The present invention provides thermosetting aqueous binder compositions of one or more cyclic enamine, including bisenamines and di- or higher functional enamines, optionally containing a water soluble or dispersible or dispersible primary amine compound. The binders are at least substantially formaldehyde free, need no polycarboxylic or polycarboxylate component, and yet provide excellent hot wet tensile strength when cured for as little time as a minute or less in use.

10 Claims, No Drawings

RAPID CURE THERMOSETS FROM 5- AND 6-MEMBERED CYCLIC ENAMINE COMPOUNDS MADE FROM DIALDEHYDES

This application claims the benefit of priority under 35 U.S.C. §119(e) of U.S. Provisional Patent Application No. 61/353,938 filed on Jun. 11, 2010.

The present invention relates to aqueous binder compositions comprising one or more 5- or 6-membered cyclic enamine compound and more water soluble or dispersible non-volatile primary amine, methods of making the same, and uses thereof as curable binders for a variety of finely divided substrate materials, such as fibers, flakes, particles and nonwovens. More specifically, the present invention relates to rapid cure thermosetting binders of cyclic enamine compounds having a single nitrogen in the heterocycle and/or oligomers thereof, e.g. 1,4-dihydropyridine or oligo(1,4-dihydropyridine) and to methods of making the binders by combining a di-aldehyde with an excess of a volatile base, e.g. ammonia, to form the cyclic enamine compound and formulating the composition with a water soluble or dispersible non-volatile primary amine compound, e.g. lysine.

Due to their favorable cost/performance, the thermosetting binder resins of choice in the past have been phenol/formaldehyde or urea/formaldehyde resins. Applications for formaldehyde resins are extensive, particularly in mineral, glass and wood composite fiber binding. In insulation products, cured mineral fiber binders allow the insulation to be compressed while retaining the rigidity that allows the compressed insulation to recover substantially to its original shape once compressive forces are removed. This allows, for example, the insulation to be shipped in a rolled, compressed state and unrolled before installation to release the compression, and allow a fluffy, heat-insulating mat to be installed. However, formaldehyde is recognized as highly toxic and has been classified as a human carcinogen by several health authorities; and environmental, health and safety (EHS) initiatives as well as new regulations are demanding formaldehyde free binders for composites in fibrous building materials such as, stonewool, glasswool, composite and cellulose fibers and flake. Most existing commercial binders that either contain formaldehyde or formaldehyde-free binders, polycarboxylic acid polymer and a polyol, are derived primarily from petroleum feed stocks which are dwindling and experiencing wide price fluctuations and contribute to atmospheric carbon dioxide. In addition, the polycarboxylic acid thermosets are acidic for use on stonewool or other alkaline substrates. Accordingly, there remains a strong need for formaldehyde free binders made from renewable sources.

Recent formaldehyde free binders have been made from more sustainable materials that are not entirely derived from petroleum feed. World intellectual Property Organization (WIPO) Patent Publication no. WO2010029266A to B. Jaffrennou discloses formaldehyde free binder compositions from the condensation of polyaldehydes with hydrogenated sugars, e.g. dextrins, as thermosets. However, the compositions when used as binders cure only in very harsh thermal conditions and provide cured products with inadequate tensile strength and water resistance. Further, the polyaldehydes from which the binders can be made, e.g. glyoxal, are toxic, may contain formaldehyde. Also, thermosets from such compositions such tend to be unsuitable for water resistant durable substrates and cure too slowly for practical application.

The present inventors have sought to provide a formaldehyde free binder to solve the problem of providing rapid curing formaldehyde-free binders that meet the need for a more durable, water resistant, thermoset binder and are made at least partly form a renewable source.

STATEMENT OF THE INVENTION

According to the present invention, rapid cure thermosetting aqueous binder compositions comprise one or more cyclic enamine compound and/or oligomer thereof, e.g. a bis-enamine, such as 1,4-dihydropyridine or an oligo(1,4-dihydropyridine), ammonia, ammonium hydroxide or salts of ammonia, e.g. ammonium phosphate, and, optionally, one or more water soluble or dispersible non-volatile amine having one or more primary amine or secondary amine group, e.g. lysine or glutamines. The compositions may, optionally, further comprise one or more polyol, sugar alcohol or carbohydrate, preferably, a sugar alcohol.

In one embodiment, the aqueous binder compositions comprise one or more cyclic enamine compound or oligomer thereof generated from the a di-aldehyde in an excess of ammonia, ammonium hydroxide or salts of ammonia, to form a bis-enamine, an oligomer thereof, a di-enamine or its oligomer, preferably, a bis-enamine. The cyclic enamine or bis-enamine compound is thus generated from the addition of excess ammonia or its salts to the di-aldehyde, e.g. glutaraldehyde, to form cyclic enamines, e.g. 1,4-dihydropyridine or oligo(1,4-dihydropyridine).

In another embodiment, the aqueous binder compositions comprise the cyclic enamine compound, ammonia, ammonium hydroxide or salts of ammonia, and, optionally, one or more water soluble or dispersible non-volatile amine, preferably, a primary amine, in a molar ratio of cyclic enamine groups to amine groups of 0.1:1 to 20:1, or, up to 15:1, or, preferably, up to 8:1 or, more preferably, 3.0:1 or higher. A 2:1 equivalent ratio of cyclic enamine groups to amine groups equates to 100 mole % of amine having one amine group per one mole of an cyclic enamine compound having two cyclic enamine groups, e.g. 1,4-dihydropyridine.

The one or more water soluble or dispersible non-volatile amine may be chosen from aliphatic hydroxy amines having one or more amine groups, e.g. alkanolamines, such as, for example, ethanolamine, aromatic amines having one or more amine groups, e.g. amino-phenols, and amino-resorcinols, amine functional polymers, proteins, such as soy flour or gelatins, amino acids, amino-saccharides, polypeptides, urea, mixtures of the amines and polyols and mixtures of the amines and carbohydrates.

In a preferred embodiment, the water soluble or dispersible non-volatile amines are primary amines such as lysine, glycine, serine, aspartic acid and other common amino acids, aliphatic primary amines and di-primary amines, aromatic primary and di-primary amino alcohols and poly(primary amines) having two or more primary amine groups such as, for example, poly(ethyleneimine). Useful polyamines can have a molecular weight of 5,000 or less, preferably 3,800 or less, or, more preferably, 2,500 or less.

In another embodiment, the water soluble or dispersible non-volatile amine have an amine equivalent weight of 2500 or more as in soy flour, gelatins and amino-saccharides, e.g. chitosan.

In another embodiment, the water soluble or dispersible non-volatile amine comprises polymers having 10 wt. % or more, or, preferably, 20 wt. % or more, of amine groups, such as ethylamine groups.

In yet another embodiment, the aqueous binder compositions further comprise a vinyl emulsion or dispersion polymer having up to 25 wt. %, preferably, up to 10 wt. %, based on the total weight of copolymerized monomers, of copolymerized carboxyl group containing monomers. Such a polymer may be a (meth)acrylate copolymer comprising greater than 30 wt. %, based on the total weight of copolymerized monomers, of a copolymerized $C_2$ or higher alkyl (meth)acrylate, or a (meth)acrylate copolymer having up to 5 wt. %, or, preferably, up to 3 wt. %, based on the total weight of copolymerized monomers of copolymerized carboxyl group containing monomers, such as methacrylic acid. Preferably, such polymers are used in amounts of up to 30 wt. %, based on the total binder solids, preferably up to 10 wt. %.

In yet still another embodiment, the aqueous binder compositions may further comprise one or more reactive water proofing agent, such as those chosen from a $C_5$ to $C_{30}$ alk(en)yl 2-hydroxyethyl alk(en)amide, $C_5$ to $C_{30}$ alk(en)yl bis(2-hydroxyethyl) amide, $C_{11}$ to $C_{30}$ alk(en)yl 2-hydroxyethyl (alk(en))amine, $C_{11}$ to $C_{30}$ alk(en)yl bis(2-hydroxy-ethyl) amine, $C_{11}$ to $C_{30}$ alk(en)yl tris(2-hydroxyethyl)amine, $C_5$ to $C_{30}$ alk(en)yl monoglyceride, $C_5$ to $C_{30}$ alk(en)yl monocarboxylate of a trihydric polyol, (poly)alkoxylated amines and (poly)alkoxylated alk(en)yl monocarboxylates. Such reactive waterproofing agents may be used in amounts of up to 10 wt. %, based on the total binder solids.

In another aspect, the present invention provides methods of making the aqueous binder compositions comprising adding one or more di-aldehyde or aldehyde oligomer having two or more aldehyde groups into an excess of ammonia ammonium hydroxide or salts of ammonia, preferably in a molar ratio of ammonia groups to aldehyde groups of 1.5:1 or more, or up to 10:1, preferably, 2.0:1 or higher, or, preferably, up to 4:1 to form a cyclic enamine compound, optionally, followed by oligomerizing the resulting compound by standing at room temperature and combining the resulting cyclic enamine compound or oligomer with water soluble or dispersible non-volatile primary amine preferably a poly(primary amine).

In yet another aspect, the present invention provides methods of using aqueous binder compositions comprising applying the binder to a substrate and curing at from 100 to 400° C., preferably, up to 200° C.

In addition, the present invention provides methods of treating substrates with the aqueous binder compositions, followed by drying and heat curing.

Further, the present invention provides articles comprising substrates treated according to the methods of the present invention.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" includes water and mixtures composed substantially of water and water-miscible solvents.

As used herein, the phrase "emulsion polymer" refers to a polymer that when combined with water or aqueous solvent forms a disperse phase.

As used herein, the term "oligo" or "oligomer" means comprising two or more repeating units, for example, up to 500 units, or up to 100 units. Oligomers and polymers may be overlapping in scope.

As used herein, the term "poly(primary amine)" means any compound having two or more primary amine groups.

As used herein, the term "non-volatile primary amine" means a primary amine having a boiling point of greater than 150° C. (@ ambient pressure).

As used herein, the term "non-volatile water soluble amine" means a non-volatile amine having a structure such that, after removal of the amine, the structure is soluble in water to an extent of >10 g/liter. For example, ethanolamine boils at 170° C. and ethanol has solubility in water of greater than 10 g/liter As used herein, the term "non-volatile water dispersible amine" means a non-volatile amine that is itself dispersible in water, e.g. polypeptides and proteins, like soy flour, and amino-saccharides, such as chitosan and muco-polysaccharides.

As used herein, the term "polymer" includes the term "copolymer", and, unless otherwise indicated, the term "copolymer" refers to polymers made from any two or more different monomers, including, for example, terpolymers, pentapolymers, homopolymers functionalized after polymerization so that two or more different functional groups are present in the product copolymer, block copolymers, segmented copolymers, graft copolymers, and any mixture or combination thereof. (Co)polymer means homopolymer or copolymer.

As used herein, the phrase "substantially formaldehyde-free" refers to compositions free from added formaldehyde, and which do not liberate substantial formaldehyde as a result of drying and/or curing. Preferably, such binder or material that incorporates the binder liberates less than 100 ppm of formaldehyde, more preferably less than 25 and most preferably less than 5 ppm of formaldehyde, as a result of drying and/or curing the binder.

As used herein, unless otherwise indicated, the term "weight average molecular weight" refers to the molecular weight of a substance as determined by size exclusion gel chromatography (SEC).

As used herein, "wt. %" or "wt. percent" means weight percent based on solids.

As used herein, the phrase "based on the total binder solids" refers to weight amounts of any given ingredient in comparison to the total weight amount of all of the non-volatile ingredients in the binder (e.g. Cyclic enamine compounds, water soluble or dispersible non-volatile primary amine sugars or polyols, emulsion copolymer(s), reactive water proofing agents, and additives).

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of from 0.1:1 or higher, or up to 3:1, preferably, 0.4:1 or higher, or, preferably, up to 2:1 means any and all of from 0.1:1 to 3:1, from 0.4:1 to 3:1, from 0.1:1 to 2:1, and from 0.4:1 to 2:1.

Unless otherwise indicated, conditions of temperature and pressure are room temperature and standard pressure, also referred to as "ambient conditions". The aqueous binder compositions may be dried under conditions other than ambient conditions.

The aqueous binder compositions of the present invention cure to provide a hard material that is rigid at elevated temperatures, e.g. 100° C. or higher and maintains most of its rigidity after exposure to water or moisture. The binders have a very low cure onset temperature. Further, the cyclic enamine compounds in the binders are easily made, are relatively easy to handle, and have a low toxicity and free aldehyde or di-aldehyde content. In addition, a solution of the cyclic enamine compound, excess ammonia or its salts, and, optionally, a water soluble or dispersible non-volatile amine, can be at or above room temperature to give a water soluble or dispersible oligomeric product which provides binders exhibiting exceptional mechanical properties.

The aqueous binder compositions of the present invention can comprise amines from renewable, natural sources, such as amino acids, vegetable feedstocks, e.g. soy protein and animal gelatins, particularly fish gelatin. The cyclic enamine containing binders formed from di-aldehydes can further be formulated with other materials from plants, such as reducing sugars or polysaccharides. Despite their water solubility, the hot wet tensile strength and, thus durability of binder treated products is improved through the use of the aqueous binder compositions of the present invention. In addition, as shown by the rapid development of physical properties during cure, the aqueous binder compositions exhibit a lower cure energy when compared to other known binders from natural or renewable feedstocks.

For each aqueous binder composition described herein, there exists an accompanying embodiment in which the aqueous composition is a binder composition and in which the composition is present in a composite material or product. As defined herein, the term "composite material" refers to materials comprising: (a) a substrate material selected from fibers, slivers, chips, particles, and combinations thereof; and (b) the binder composition of the described embodiment. Composites may also comprise a single layer of a laminate or multi-layer film.

The present invention provides aqueous binder compositions comprising a total solids of from 5 to 95 wt. %, preferably, 5 wt. % or more, or, preferably, 20 wt. % or more, or, more preferably, 35 wt. % or more, or, more preferably, 50 wt. % or less, based on the total weight of the aqueous binder. The aqueous binders also include powdered binders which can be derived from drying any of the aqueous binder solutions.

The aqueous binder compositions comprise at least one cyclic enamine compound or oligomer. Such compounds include, for example, (oligo)1,4-dihydropyridine and the reaction product formed by mixing into an excess of ammonia, ammonium hydroxide or salts of ammonia, one or more dialdehyde or oligomeric aldehyde, such as, for example, glutaraldehyde, 1,6-hexanedial, succinic di-aldehyde, and malonic dialdehyde, di-aldehydes having 4 to 7 carbons, cycloaliphatic aldehydes having two or more aldehyde groups preferably, succinic di-aldehyde or glutaraldehyde.

The aqueous binder composition of the present invention may comprise at least one water soluble or dispersible non-volatile amine such as, an amino acid for example lysine, or glycine, a protein or polypeptide, e.g. from soy or other vegetable sources, polypeptides, aliphatic polyamines, such as triethylene tetraamine, aromatic polyamines, such as oligomers and polymers or copolymers of ethylene imine and amine functional polymers, such as polyguanides, polylysine, (co)polymers of n-aminoalkyl (meth)acrylates, such as aminoethyl methacrylate, polyguanidines, or polyaniline. Preferably, the non-volatile amine is a primary amine.

Suitable amines include, for example, diamines and polyprimary polyamines, alkyl diprimary or higher primary diamines, e.g. putrescine and n-alkylenediamines like ethylene diamine, and hexamethylene diamines, aminoguanidine and its salts, e.g. aminoguanidine hydrochloride; cycloaliphatic diamines, such as, for example, di-aminoethylpiperazine; primary amine functional amino acids, such as lysine and aminoglycine; aromatic di-amines, such as, for example, bis-(aminomethyl)cyclohexane (bisAMC), m-xylenediamine (MXD); alkanolamines; and polyamine polymers, such as polyethyleneimines, polyethylenimine containing copolymers and block copolymers having 10 wt. % or more of amine groups, and any other (co)polymer which has at least 10 wt. %, preferably 20 wt. %, of amine groups. One suitable cycloaliphatic primary diamine is PRIMENE™ MD from Dow Advanced Materials, formerly the Rohm and Haas Company (Philadelphia, Pa.).

Compositions providing rapid cure, durable thermosets can be extended with up to 70 wt. %, or up to 50 wt. %, or 10 wt. % or more, or, 20 wt. % or more of carbohydrates. Carbohydrates may comprise polyols, such as, for example, glycerine, sugar alcohols, such as, for example, sorbitol or mannitol, and carbohydrates, such as, for example, reducing sugars, like dextrose or fructose, dextrins, such as, maltodextrin, lignins, and gums, such as guar gum. Reducing sugars are mono-saccharides, e.g. aldoses and ketoses, or di-saccharides that have an aldehyde or a ketone in their open chain form. This allows the sugar to act as a reducing agent, for example in a reaction with an amine. Reducing sugars include glucose, fructose, glyceraldehydes, lactose, arabinose and maltose. Further, some keto sugars are reducing sugars because they may be converted to an aldehyde via a series of tautomeric shifts to migrate the carbonyl to the end of the chain. This pathway could become accessible during the thermal curing process.

A number of suitable reducing sugar sources may be used, such as corn syrup, high fructose corn syrup, and other fructose and dextrose equivalents. In one embodiment, the reducing sugar component comprises a high dextrose content syrup, e.g. having a greater than 30 wt. % dextrose. In such syrups, the higher the dextrose content, the better; syrups with greater than 95%, dextrose content are commercially available, for example ADM 97/71 corn syrup, from Archer Daniels Midland Company (Decatur, Ill., USA).

In a further embodiment suitable for flexible binders, the aqueous composition further comprises an emulsion polymer, such as acrylic emulsions having, as polymerized units up to 25 wt. % polymerized acid co-monomers, e.g. (meth) acrylic acid, preferably up to 3 wt. %, or hydrophobic emulsion polymers comprising greater than 30% by weight, based on the weight of the emulsion polymer solids, ethylenically-unsaturated acrylic monomer containing a $C_2$ or greater alkyl group, and acrylic or styrene acrylic emulsion polymers. The emulsion polymers may be present in the composition in an amount of 1 wt. % or more, or up to 25 wt. %, based on the total binder solids.

In another embodiment, the aqueous binder compositions further comprise a reactive water proofing agent. Alkoxylated forms of reactive water proofing agent may include, for example, a $C_5$ to $C_{30}$ alk(en)yl monocarboxylate of a (poly) alkoxylated trihydric polyol, $C_5$ to $C_{30}$ alk(en)ylamine (poly) alkoxylate, $C_5$ to $C_{30}$ alk(en)yl diamine (poly)alkoxylate, $C_5$ to $C_{30}$ alk(en)ylamine (poly)alkoxylate containing an ether or thiother group in the alk(en)ylamine group, and mixtures thereof. Reactive water proofing agents may be used in amounts of up to 10 wt. %, based on the total binder solids.

In yet another embodiment, the aqueous binder compositions may further comprise additives, such as catalysts, biocides; flame retardants, corrosion inhibitors such as, for example, triazole and phosphate compounds, tin oxalates, thioureas, oxalates, and chromates, dedusting agents such as, for example, mineral oils, anti-foaming agents such as dimethicones, silicon-polymer (polysiloxane) oils and ethoxylated nonionics; and coupling agents such as silanes, particularly Silquest™ A-187 (manufactured by GE Silicones-OSi Specialties, located in Wilton Conn.); other amino silanes such as 3-aminopropyl dialkoxysilanes and 3-(2-aminoethyl)aminopropylsilanes. The biocides may, in one embodiment be applied as separate solution along with the aqueous binder compositions in use as part of binder application. Alternatively or in conjunction with applying biocide to the binder, biocide can be applied to the "white water" at the production site. This water can be used in processing the manufactured product and or making the applied binder solution.

Useful catalysts may include phosphorous based catalysts such as sodium hypophosphite, titanates and zirconates such as organic titanates and zirconates sold by DuPont under the Trade name Tyzor, for example, water soluble or dispersible Tyzors, such as, Tyzor™ LA, Tyzor™ 131, Tyzor™ 217, and Tyzor™ 218; organo-tin salts, such as tin(IV) alkoxylates and dibutyltin dilaurate; mono- and di-carboxylate salts of aluminum or magnesium, and compounds having the formula $MX_n$ wherein M is a metal, X is an organic acid, keto-acid, e.g. gluconic acid, reducing sugar or alkoxy(alkyl) group, and n is an integer of from 1 to 5, such as iron (II) (gluconate)$_2$. Examples of such compounds include, for example, the citrates, lactates, and gluconates of zinc, aluminum, zirconium, iron, magnesium, tin, titanium and boron; and titanates or zirconates of alcohols or carboxylic acids.

To minimize the formaldehyde content of the aqueous composition, it is preferred, when preparing a polymer-containing formaldehyde-free curable composition, to use polymerization adjuncts and additives which are themselves formaldehyde free, or do not contain or generate formaldehyde during binder formation, application or cure.

The present invention provides methods of using the binder comprising applying the binder to a substrate and drying and/or curing. In drying (if applied in aqueous form) and curing the curable compositions, the duration, and temperature of heating, will affect the rate of drying, ease of processing or handling, and property development of the treated substrate. Suitable heat treatment temperatures may range 75° C. or more, and up to 400° C. Suitable cure times range from 30 seconds to 60 minutes, preferably 10 minutes or less, or, more preferably, 6 minutes or less. The preferred treatment is substrate dependant. Thermally sensitive substrates such as cellulose fibers may be treated at 75 to 175° C. while thermally less sensitive composites may be treated at up to 200° C. and thermally resistant substrates such as mineral fibers may be treated at up to 300° C. for as long as necessary to effect cure and maximize thermosetting properties. After application, the binder can be cured by heating the coated non-woven to a sufficient temperature where it cures on the substrate.

The binder can be applied to the substrate, such as, for example, a web of fibers, by any suitable means including, for example, air or airless spraying, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

Drying and curing can be done in two or more distinct steps, if desired. For example, the curable composition can be first heated at temperatures and for times sufficient to at least partially dry, but not fully cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

Suitable substrates for binder application may include, for example, textiles, including cotton, linen, wool, and synthetic textiles from polyester, rayon, or nylon, and superabsorbent fibers; vegetable or cellulosic fibers, such as jute, sisal, flax, cotton and animal fibers; as well as heat resistant substrates, such as metal; plastics; synthetic fibers, e.g. polyester, rayon, poly(acrylonitrile) (PAN), poly(lactic acid) (PLA), poly(caprolactone) (PCL), aramid fibers, polyimide fibers, polyolefins and bi-component fiber comprising two or more fiber-forming polymers such as polypropylene and polyethylene terephthalate; mineral fibers, such as glass and mineral fibers, slag or stonewool, ceramic fibers, metal fibers, carbon fibers, and woven and non-woven fabrics made therefrom; and heat-sensitive substrates, such as wood, including, solid wood, wood particles, fibers, chips, flour, pulp, and flakes; paper and cardboard.

The binders of this invention may preferably be used to treat non-woven webs. "Non-woven web(s)" refers to any article or sheet-like form made from natural and/or synthetic fibers wherein the fibers are aligned in a random or semi-random order (i.e., not deliberately ordered) whether by mechanical means such as, for example, by entanglement caused by needle-punching, spunbonding, spunlace webs, meltblown webs, air-laid (dry laid) process, and by a wet-laid process; and/or by chemical means such as, for example, treatment with a polymeric binder; or by a combination thereof. Mineral fibers may be in the form of a web, i.e. blown into a forming chamber, sprayed with a binder, and deposited as a web on to a conveyer. Some ordering of fibers occurs during any web forming process (primarily in the machine direction). Included in the definition of non-woven webs suitable for use with this invention are porous films prepared by the action of chemical or mechanical processing (e.g., apertured films).

In a preferred embodiment, the binder treated product comprises non-wovens, such as, for example, a heat-resistant non-woven. Heat resistant non-wovens may also contain fibers which are not in themselves heat-resistant such as, for example, polyester fibers, rayon fibers, nylon fibers, and superabsorbent fibers, in so far as or in amounts such that they do not materially adversely affect the performance of the substrate.

Some suitable heat resistant non-wovens are used at temperatures higher than ambient temperature such as, for example, glass fiber-containing non-woven fabrics which are impregnated with a hot asphaltic composition pursuant to making roofing shingles or roll roofing material. When a non-woven fabric is contacted with a hot asphaltic composition at temperatures of from 150° C. to 250° C., the non-woven fabric can sag, shrink, or otherwise become distorted. Therefore, non-woven fabrics which incorporate a curable composition should substantially retain the properties contributed by the cured aqueous composition such as, for example, tensile strength. In addition, the cured composition should not substantially detract from essential non-woven fabric characteristics, as would be the case, for example, if the cured composition were too rigid or brittle or became sticky under processing conditions.

In another embodiment, this invention includes methods for treating a mat made from a web of fibers, and, preferably, transferred to a moving screen running through a binder application station where the aqueous binder of the invention is applied to the mat.

The binder add on level in substrate is often substrate and function dependant. Add-on can range from 3 wt. % or more, or 10 wt. % or more, or up to 35 wt. percent of the finished substrate, preferably 12 wt. % or more, or, most preferably 15 to 25 wt. %, based on the total weight of the treated dry substrate, prior to cure.

Some suitable uses for the binder of the present invention include, for example, making non-structural composites and laminates for indoor furniture, trim and molding; and the wet end formation and dry end treating or coating of paper, paperboard and cardboard, such as filter media; and the making and treating of woven and non-woven fabrics, such as, for example, fiberglass and stonewool insulation batting, polyester and spunbonded roof shingles, flooring or roofing underlayment and/or scrim, and gypsum board facings, and filter media, such as air and oil filters.

EXAMPLES

The following examples serve to better illustrate the invention, which is not intended to be limited by the examples.

Binder Preparation:

A 250 ml beaker equipped with a magnetic stirrer and thermocouple is charged with ammonium hydroxide (aqueous, Fisher Scientific, label assay 28-30 wt. %) and cooled in an ice to 2-5° C. A mixture of glutaraldehyde and distilled water is then slowly added drop-wise into the ammonia mixture. The rate of addition is maintained such that the temperature does not exceed 15° C. Next the mixture is removed form the ice bath and the 'amine' is added neat in portions. The binder solution solids are calculated by adding the total weight of the glutaraldehyde and amine and dividing by the batch weight. The target solids are approximately 20%. The solutions are then padded onto Whatman GF/A filter paper such that the add-on is approximately 20%, see below for determination of binder add-ons. The binders are shown in Table 1, below.

Treatment of Glass Microfiber Filter Paper and Tensile Testing:

Binders as shown in Table 1, below, were prepared by admixing components of each formulation to provide approximately 150 grams of an aqueous solution at 20 wt. % solids. A binder impregnated microfiber filter (Whatman International Inc., Maidstone, England, GF/A, catalog No. 1820 866), in 20.3 cm×25.4 cm sheets was prepared by drawing a filter sheet through a trough filled with 120 grams of a previously diluted portion of the 20 wt % formulation, further diluted to 15 wt % solids. Sandwiching the soaked sheets between two cardboard sheets to absorb excess binder, and pressing between the two cardboard sheets in a Birch Bros. Padder, 68.9476 kPa/speed 5 m/min. The resulting samples are dried @ 90° C. for 90 seconds in a Mathis Oven that is vented or equipped with a devolatilizer.

Post drying weight was determined to calculate binder add-on (dry binder weight as a percentage of filter paper weight.) All sheets had about 20 wt. % of binder add-on. "Add on" is the wt. % based on filter sheet weight of binder solids retained on the filter sheet after curing. The dried sheets were then cured at 190° C. for 60 seconds and 180 seconds in the same type of Mathis oven used to dry the samples.

The cured sheets were cut into 2.54 cm (1 inch) (cross machine direction) by 10.16 cm (4 inch) (machine direction) strips and tested for tensile strength in the machine direction in a Thwing-Albert Intelect 500 tensile tester. The fixture gap was 5.08 cm (2 inche)s and the pull rate was 2.54 cm (1 inch)/minute. Strips were tested either "as is" (dry tensile) or immediately after a 10 minutes soak in water at 85° C. (10 min wet tensile.) Tensile strengths were recorded as the peak force measured during parting in newtons. Data reported are averages of seven test strips are presented in Table 2, below.

TABLE 1

Binder Formulations

| Example | Glutaraldehyde (50% w/w in H$_2$0) | Water | Amine | NH3/ H2O | Add-on (wt. %) |
|---|---|---|---|---|---|
| 1 | 40 g | 30 g | Lysine 4.4 g | 47 g | 21% |
| 2 | 40 g | 47 g | Lysine 8.7 g | 47 g | 20% |
| 3 | 40 g | 81 g | Lysine 17.4 g | 47 g | 22% |
| 4 | 40 g | 30 g | Glycine 4.47 g | 47 g | 21% |
| 5 | 40 g | 48 g | Glycine 8.9 g | 47 g | 21% |
| 6 | 40 g | 53 g | Arginine 10.4 g | 47 g | 19% |
| 7 | 40 g | 41 g | Cysteine 7.2 g | 47 g | 21% |
| 8 | 40 g | 33 g | Piperazine 5.1 g | 47 g | 20% |
| 9 | 40 g | 28 g | Polyethlyenimine 10.2 g | 47 g | 10% |
| 10 | 40 g | 47 g | Fish Gelatin[1] 8.7 g | 47 g | 17% |
| 11 | 40 g | 78 g | Fish Gelatin[1] 16.4 g | 47 g | 21% |
| 12 | 40 g | 47 g | Soy Flour[2] 8.7 g | 47 g | 20% |
| 13 | 40 g | 27 g | Ethanolamine 3.6 g | 47 g | 20% |
| 14 | 40 g | 27 g | Urea 3.6 g | 47 g | 19% |
| 15 | 30 g | 9.8 g | none | 32 g | 19% |

[1] Norland HiPure ™ Fish Gelatin (lot# 14719) Cranbury/New Jersey.
[2] Archer Daniels Midland 325 mesh dispersed with 0.087 g bisulfite (Decatur, Illinois, USA).

In each of the binders in Table 1, above, the equivalent ratio of ammonia groups to aldehyde groups was 2.0:1. The various amines were added in various amounts. In Example 1, the ratio of cyclic enamine groups to amine groups is 6.6:1.

As shown in Table 2, below, the binders of the present invention all exhibit good tensile strengths with the exception of arginine in Example 6 which may be considered an ammonia scavenger which retards the development of the binder. Aside from Example 6, the compositions performed well with a wide range of amine materials in addition to the enamine compound. Even the compositions of Examples 3, 11 and 15, which have a major portion of water soluble or dispersible amine, gave acceptable hot wet tensile strengths. Example 15 included a secondary amine

TABLE 2

Tensile Testing Results (lb)

| Example | Dry 60 sec | Hot Wet 60 | Dry 180 | Hot Wet 180 |
|---|---|---|---|---|
| 1 | 73.4 | 40.5 | 67.2 | 39.1 |
| 2 | 76.5 | 35.1 | 62.7 | 35.6 |
| 3 | 81.8 | 26.7 | 86.7 | 28.0 |
| 4 | 54.7 | 29.8 | 62.3 | 35.1 |
| 5 | 57.8 | 29.4 | 60.9 | 32.5 |
| 6 | 45.8 | 1.8 | 42.3 | 5.8 |
| 7 | 48.5 | 31.1 | 53.4 | 32.9 |
| 8 | 61.4 | 33.8 | 61.4 | 34.7 |
| 9 | 54.3 | 39.6 | 36.5 | 22.7 |
| 10 | 62.7 | 35.6 | 65.4 | 34.7 |
| 11 | 78.3 | 38.3 | 59.2 | 29.4 |
| 12 | 65.4 | 36.5 | 64.1 | 33.8 |
| 13 | 60.1 | 34.7 | 61.8 | 36.5 |
| 14 | 52.9 | 28.5 | 54.7 | 30.2 |
| 15 | 55.6 | 25.8 | 48.0 | 20.0 |

We claim:

1. A thermosetting aqueous binder composition comprising one or more cyclic enamine compound and/or oligomer thereof and ammonia or ammonium hydroxide.

2. The binder composition as claimed in claim 1, wherein the cyclic enamine or oligomer comprises a bis-enamine or its oligomer.

3. The binder composition as claimed in claim 2, wherein the bis-enamine or oligomer is 1,4-dihydropyridine or oligo(1,4-dihydropyridine).

4. The binder composition as claimed in claim 1, further comprising one or more water soluble or dispersible non-volatile amine.

5. The binder composition as claimed in claim 4, comprising the cyclic enamine compound and water soluble or dispersible non-volatile amine in a molar ratio of cyclic enamine groups to amine groups of 0.1:1 to 15:1.

6. The binder composition as claimed in claim 4, wherein the water soluble or dispersible non-volatile amine is a primary amine chosen from aliphatic hydroxy amines having one or more primary amine groups, aromatic amines having one or more primary amine groups, amine functional polymers, proteins, gelatins, amino acids, amino-saccharides, polypeptides, urea, mixtures of the primary amine and polyols, and mixtures of the primary amine and carbohydrates.

7. The binder composition as claimed in claim 6, wherein the water soluble or dispersible non-volatile amine is a poly(primary amine) having two or more primary amine groups.

8. The binder composition as claimed in claim 1, optionally, further comprising one or more polyol, carbohydrate, or sugar alcohol.

9. The binder composition as claimed in claim 1, wherein the one or more cyclic enamine compound or oligomer thereof is generated from a di-aldehyde in an excess of ammonia, ammonium hydroxide or a salt of ammonia.

10. A method of making the binder composition as claimed in claim 1 comprising adding one or more di-aldehyde or aldehyde oligomer having two or more aldehyde groups into an excess of ammonia or ammonium hydroxide in a molar ratio of ammonia groups to aldehyde groups of 1.5:1 or more.

* * * * *